L. M. DULL.
CARBURETER.
APPLICATION FILED JULY 21, 1913.
1,122,703.
Patented Dec. 29, 1914.
2 SHEETS—SHEET 1.
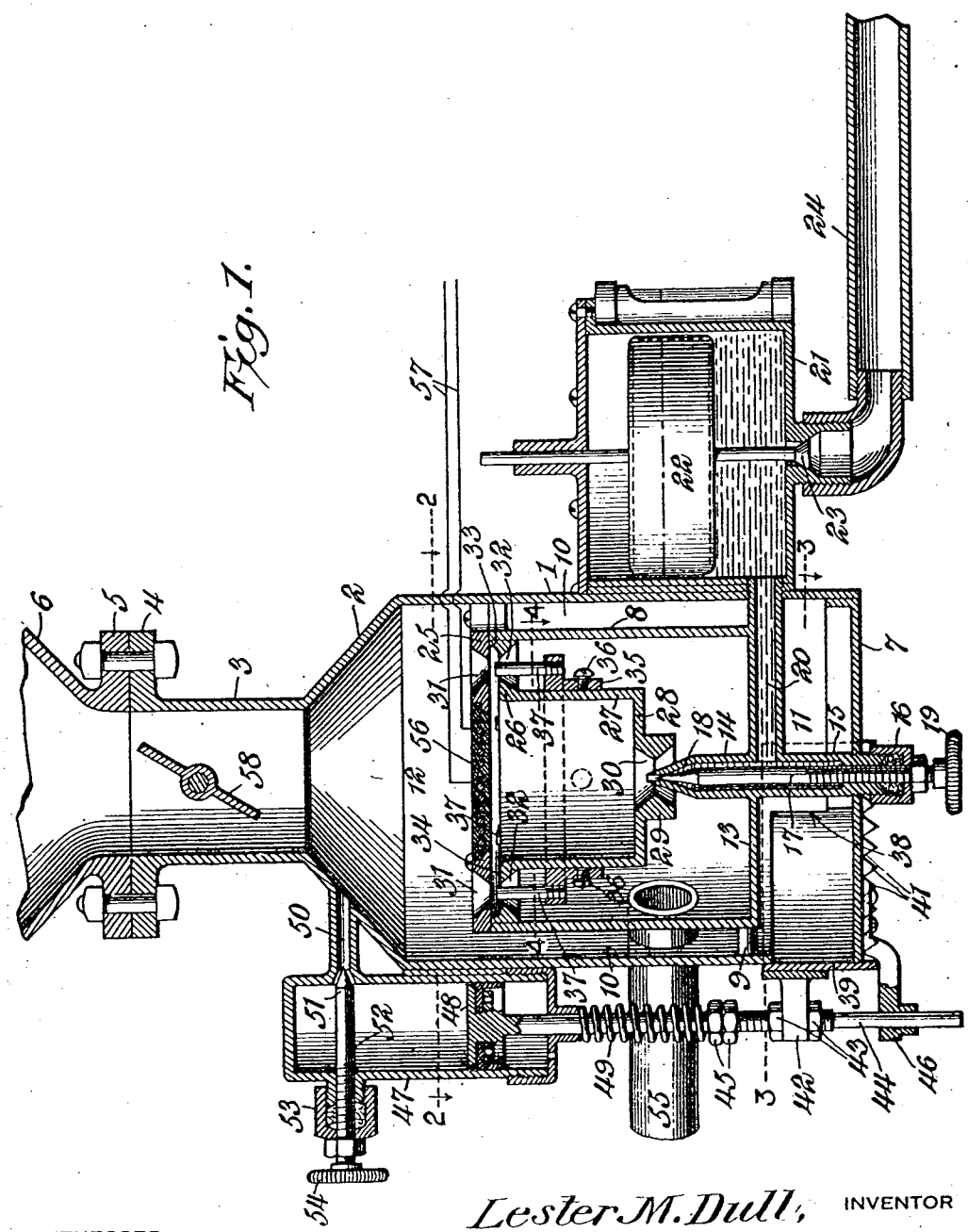
WITNESSES
Howard D. Orr.
F. T. Chapman
Lester M. Dull, INVENTOR
BY
E. G. Siggers.
ATTORNEY

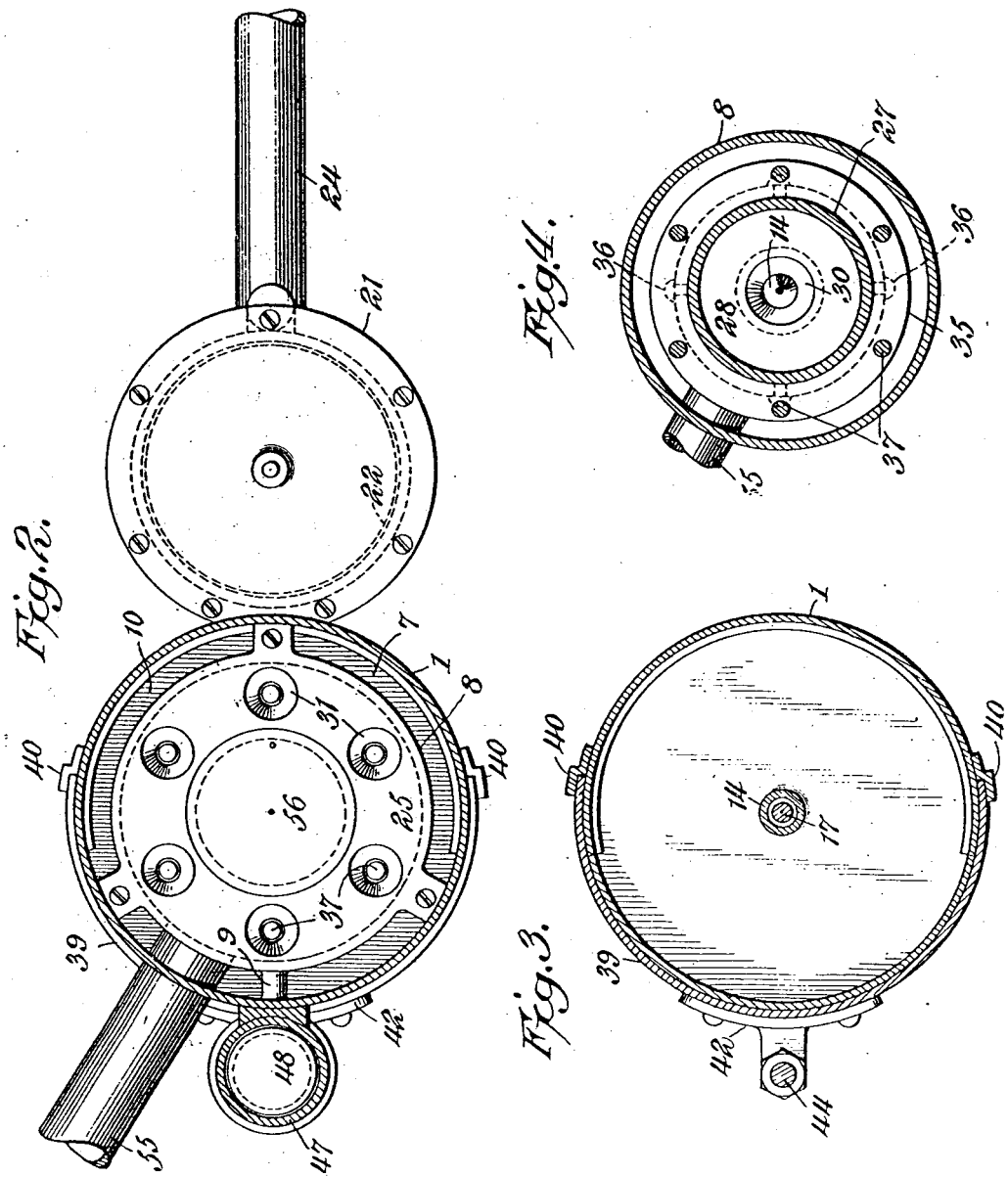

UNITED STATES PATENT OFFICE.

LESTER M. DULL, OF LOS ANGELES, CALIFORNIA.

CARBURETER.

1,122,703.   Specification of Letters Patent.   Patented Dec. 29, 1914.

Application filed July 21, 1913. Serial No. 780,269.

*To all whom it may concern:*

Be it known that I, LESTER M. DULL, a citizen of the United States, residing at Los Angeles, in the county of Los Angeles and State of California, have invented a new and useful Carbureter, of which the following is a specification.

This invention has reference to improvements in carbureters, and its object is to provide a carbureter in which there is produced a particularly intimate mixture of fuel and air, and in which such heavy fuels as kerosene may be employed without the necessity of using a heater.

In accordance with the present invention the fuel, which may be gasolene or kerosene or distillate, or any suitable type of fuel, reaches a carbureting chamber through a nozzle controlled by a needle valve, as is customary, and the structure is such that air entering another chamber surrounding the carbureting chamber is directed thereinto in surrounding relation to the fuel nozzle through a Venturi tube. From the carbureting chamber the rich mixture finds escape through a plurality of flaring passages each controlled by a relatively fixed member so arranged that the mixture enters each flaring passage at the smaller end through a constricted path in a manner to cause the mixture to rapidly spread in its travel through the flaring passage and after it leaves the latter. Air entering the chamber surrounding the carbureting chamber is also directed around each of the controlling members for the flaring passages in a manner to be directed against the walls of the smaller end of the flaring passages as against a knife edge, thus causing a particularly intimate mixture of additional air with the enriched air as they travel together through the flaring passages, wherefore any globules of liquid fuel reaching the flaring passages are broken up into extremely minute particles and thereby present such relatively large surfaces to the air as to become readily absorbed thereby.

It is customary to preheat the air entering the air chamber surrounding the carbureting chamber and feeding air thereto by taking such air from a point adjacent to the exhaust duct of the engine, but while this is advisable, it is not necessary in the carbureter of the present invention.

Since under certain circumstances a further dilution of the rich mixture on its way to the engine is advisable, there is provided still another air chamber having a passageway in surrounding relation to the first air chamber to direct air into what may be termed the mixing chamber into which the rich mixture is discharged through the flaring passages in surrounding relation to the series of flaring passages, so that the additional air streams entering the mixing chamber in the general line of flow of the rich mixture toward the engine are to a greater or less extent traversed by the rich mixture, and the intimacy of association of the additional air therewith is largely improved. The mixing chamber is connected to the engine manifold through a contracted opening in which may be located a controlling valve controllable in any suitable manner, as by the operator of the engine.

The auxiliary supply of air which in the installed carbureter is taken into a chamber underlying the first-named air chamber, is under the control of a valve in turn controlled by the subatmospheric pressure established by the suction of the engine in the mixing chamber and the action of the subatmospheric pressure upon the last-named valve is readily controllable by means which may be set at any time by the operator. By the structure last described surging of the auxiliary air valve is effectively obviated.

Moreover, the present invention contemplates the employment of a preheater within the carbureter but designed solely for starting purposes.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a central vertical section of a carbureter embodying the present invention. Fig. 2 is a section on the line 2—2 of Fig. 1. Fig. 3 is a section on the line 3—3 of Fig. 1. Fig. 4 is a section on the line 4—4 of Fig. 1.

Referring to the drawings there is shown a casing or shell 1, which is usually in an upright position when the carbureter is installed, wherefore terms expressive of position will be used with respect to the normal operative position of the structure. At the upper end the shell 1 has a contracted portion 2 terminating in a central neck 3 provided at the upper end with an outstanding flange 4 adapted to a like flange 5 of a manifold 6, such as is customarily provided on engines to conduct the explosive mixture supplied by the carbureter to the engine cylinders.

The lower end of the casing 1 is provided with a closure 7 which for convenience of manufacture may be made separate from the casing 1 and secured thereto in any suitable way. Within the casing 1 at a point between the top or crown portion 2 and the bottom 7 is another casing 8 in spaced relation to the casing 1 and substantially concentric therewith, being held to the casing 1 by spacing lugs 9, or in any other appropriate manner, so that there is formed an annular passage 10 between the space or chamber 11 below the bottom of the subcasing 8 and the bottom 7 of the casing 1, and another space or chamber 12 between the top portion of the casing 8 and the neck 3.

The sub-casing 8 is formed with a bottom portion 13 which may be integral therewith or otherwise constructed, and at the center portion of the bottom 13 is a nozzle 14 uprising from the bottom 13 and provided with a downward continuation 15 extending through the bottom 7 and outside of the casing 1 receiving a packing gland 16 through which extends a threaded stem 17 terminating in a needle point 18 entering the tip end of the nozzle 14, while a manipulating button or wheel 19 provides a convenient means for turning the stem 17 to open or close the valve 18. Connected to one side of the continuation 15 is a pipe or duct 20 leading to the exterior of the casing 1 where it communicates with the interior of a float chamber 21 containing a float 22 in turn controlling a valve 23 for closing and opening communication between a feed pipe 24 and the float chamber 21, all in the manner customary in carbureters, and hence needing no particular description herein.

Secured to the upper end of the sub-casing 8 is a top member 25 which may be in the form of a ring or annulus, and this ring carries another ring 26 adapted to extend a short distance into the upper end of the casing 8 and depending from the ring 26 is still another casing 27 having a bottom head 28 terminating in a central boss 29 through which is formed a passage 30 constituting a Venturi tube, and into which the upper extremity of the nozzle 14 extends.

The ring 25 is formed with a circular series of upwardly flaring passages 31, and the ring 26 is formed with a like series of upwardly contracting passages 32 matching the passages 31, but the ring 26 has a marginal upstanding flange 33 spacing the two rings one from the other to provide a shallow annular space 34 between those portions of the two rings 25 and 26 having the matching passages 31 and 32. The inclination of the walls of the passages 31 and 32 is such that they form acute angles at the smaller ends of the passages with the respective facing walls or surface of the rings.

Surrounding the casing 28 is a collar 35 which may be secured to the casing 27 by set screws 36, thus permitting an adjustment of the collar lengthwise of the casing 27, which in the particular showing of the drawings is up and down. Fast to the collar 35 is a circular series of pins 37 of a size to extend through the passages 32 in concentric spaced relation to the smaller ends of these passages and the length of the pins 37 and the adjustment of the collar 35 are such that those ends of the pins remote from the collar are located about midway of the distance between the spaced smaller or contracted ends of the matching passages 31 and 32, this arrangement being for a purpose which will presently appear.

The portion of the casing 1 in which is located the chamber 11 is cut away for an appropriate part of its circumference to form an opening 38, and this opening is normally closed by a curved cover or plate 39 having its curvature conforming to that of the walls of the casing 1, since this casing is customarily made cylindrical, and the cover plate is of greater width than the height of the opening 38. Moreover, the cover or plate is exterior to the walls of the casing 1 and its extremities are lodged in guide strips 40 fast to the exterior of the casing 1.

That edge of the cover 39 which constitutes the lower edge is formed with teeth or serrations 41 so arranged that when the cover is moved in one direction the teeth will rise beyond the bottom 7, thus opening the chamber 11 to the atmosphere to extents dependent upon how much the indentations between the teeth are carried above the top surface of the bottom 7.

Fast to the exterior of the cover or plate 39 is a bracket 42 and secured to this bracket by lock nuts 43 is a rod 44 having a threaded portion of sufficient length to receive other lock nuts 45. Moreover, the rod 44 is of sufficient length to extend through another bracket 46 fast to the bottom 7 and outstanding therefrom.

Fast to the casing 1 at a relatively high point thereon is a cylinder 47 in which is lodged a piston 48 fast to what constitutes the upper end of the rod 44, which latter enters the cylinder 47 through the lower end thereof, and between the cylinder 47 and the lock nuts 45 the rod 44 is surrounded by a spring 49 tending at all times to force the rod downwardly until the lower edge of the cover 39 engages the bracket 46, at which point the opening 38 is entirely closed to the atmosphere.

The interior of the cylinder 47 communicates with the chamber 12 by a duct 50 and this duct is entered where it joins the cylinder 47 by a needle valve 51, the stem 52 of which is extended through the opposite side of the cylinder 47 and through a packing gland 53 thereon and terminates in a manipulating wheel 54, whereby the free opening of the duct 50 into the cylinder 47 may be controlled to a nicety.

Air is conveyed from any suitable point to the interior of the chamber 8 by a pipe 55 which traverses the space 10, and this pipe may come from a point where air may be taken closely adjacent to the exhaust duct of the engine, so as to be preliminarily heated, but although this is advantageous it is not entirely necessary for the operation of the present invention, even in case of the use of relatively heavy liquid fuels.

Under some circumstances it is advisable, especially on starting, to heat the carbureting chamber which is within the casing 27 and for this purpose there is lodged in the ring 25 an electric heating element 56 having leads 57 extending to a suitable source of current which in the case of an automobile may be the battery customarily provided, or in some cases, a magneto or dynamo electric machine.

Let it be assumed that the float chamber 21 contains an appropriate quantity of fuel coming through the pipe 24 and controlled by the valve 23, and that the valves 18 and 51 are appropriately open and, moreover, that the pins 37 have been properly adjusted.

On the suction stroke of the engine there is created subatmospheric pressure within the chamber 12 as modified by the position of a controlling valve 58 in the neck 3, which valve may be under the control of the operator of the engine or in the case of an automobile, of the vehicle. At each suction stroke subatmospheric pressure is established not only within the chamber 12, but within the chamber inside of the casing 27, and within the chamber inside of the casing 8, so that air is drawn into the chamber 8 through the pipe 55 and by way of the Venturi tube 30 into the chamber within the casing 27, this resulting in a suction causing an amount of fuel to flow past the valve 18 into the chamber within the casing 27. The indrawn fuel and the air entering through the tube 30 become quite intimately mixed within the casing 27, wherefore the chamber within said casing constitutes what is usually termed the carbureting chamber. This mixture of fuel and air is drawn into the chamber 12 through the space 34 and the circular series of passages 31, the mouths of which are more or less throttled by the adjacent ends of the pins or rods 37. At the same time the air within the chamber 8 finds its way through the passages 32 and through the contracted ends thereof as throttled by the presence of the pins 37 and engages the rich mixture passing by way of the space 34 into the passages 31 where the rich mixture and the additional air become intimately intermixed, and the streams engaging the sharp edges at the small ends of the passages 31 are acted upon after the manner of an atomizer, so that the mixtures of primary and secondary air and liquid fuel issue from the flaring ends of the passages 31 in divergent streams with the liquid fuel not already absorbed, in the form of globules of practically impalpable size, thus presenting large surfaces for absorption by the unsaturated air.

Within the chamber 12, which may be termed a mixing chamber, the fuel becomes absorbed by the air, so that on reaching the neck 3 and the manifold 6, the mixture is in substantially ideal condition for action in the cylinders of the engine.

The subatmospheric pressure created within the chamber 12 by the suction of the engine is also established within the cylinder 47 to an extent permitted by the throttled passage 50 and this subatmospheric pressure tends to move the piston 48 against the action of the spring 49, such movement being participated in by the cover 39 constituting an air valve. The suction being powerful enough the valve 39 is lifted until the spaces between the teeth 41 open into the chamber 11 and a continuation of the movement of the valve 39 just described causes a rapid increase in the effective area of the opening between the chamber 11 and the atmosphere. Air is now drawn into the chamber 11 since this latter chamber being in communication with the chamber 12 by the annular passage 10 has subatmospheric pressure established therein, so that as soon as the valve 39 opens, air rushes into the chamber 11 and through the relatively large annular passage 10 about the chamber within the casing 8 into the chamber 12 where additional air becomes mixed with the enriched air already within the chamber and dilutes it so that under these circumstances a diluted mixture passes to the manifold 6.

The valve 51 prevents any rapid changes of pressure within the cylinder 47, so that the changes in pressure therein are relatively slow, thus preventing any tendency of surging and consequent oscillation or fluttering of the valve 39.

Sometimes it is desirable to preheat the carbureting chamber and in such instances the electric heater element 56 is charged with electric current, thus heating the interior of the casing 27, but this is necessary only on starting and then only under certain atmospheric conditions.

With a carbureter constructed in accordance with the present invention heavy fuels may be used continuously without the necessity of preheating to cause vaporization. The carbureter acts satisfactorily with gasolene, kerosene, distillate and other similar liquid fuels. It is found that kerosene will thoroughly vaporize and carburet the air without any preliminary heating to cause vaporization, and this is believed to be due to the extreme atomization of the fuel because of the throttled passages 31 controlled by the pins 37.

What is claimed is:—

1. A carbureter provided with a carbureting chamber, means for the introduction of fuel thereinto, and a mixing chamber, said carbureting and mixing chambers being separated by a wall with passages therethrough each flaring toward the mixing chamber and out of line with the fuel inlet.

2. A carbureter provided with a carbureting chamber, means for the introduction of fuel and air thereinto, a mixing chamber, and an air chamber in communication with the carbureting chamber for supplying air thereto, the air chamber and carbureting chamber being provided with alined openings for directing carbureted air and other air simultaneously into the mixing chamber.

3. A carbureter having a carbureting chamber, an air chamber in surrounding relation to the carbureting chamber with the latter provided with means at one end for the passage of air from the air chamber to the carbureting chamber, means for the introduction of fuel into the carbureting chamber, and a mixing chamber, the air chamber and carbureting chamber being provided with matching openings for directing carbureted air and air directly from the air chamber simultaneously into the mixing chamber.

4. A carbureter having a carbureting chamber, an air chamber in surrounding relation to the carbureting chamber with the latter provided with means at one end for the passage of air from the air chamber to the carbureting chamber; means for the introduction of fuel into the carbureting chamber, and a mixing chamber, the air chamber and carbureting chamber being provided with matching openings for directing carbureted air and air directly from the air chamber simultaneously into the mixing chamber, the openings leading into the mixing chamber being flaring.

5. A carbureter having a carbureting chamber, an air chamber in surrounding relation to the carbureting chamber with the latter provided with means at one end for the passage of air from the air chamber to the carbureting chamber, means for the introduction of fuel into the carbureting chamber, and a mixing chamber, the air chamber and carbureting chamber being provided with matching openings for directing carbureted air and air directly from the air chamber simultaneously into the mixing chamber, the openings leading into the mixing chamber being flaring, and the openings leading from the air chamber contracting.

6. In a carbureter, a carbureting chamber having means at one end for the introduction of air and at the other end provided with an outstanding flange having a series of contracting passages therethrough, an air chamber inclosing the carbureting chamber and its flange and arranged to supply air to the interior of the carbureting chamber, means for introducing fuel into the carbureting chamber through the air opening thereof, a cover member for the carbureting and air chambers arranged in spaced relation to the flange of the carbureting chamber and provided with passages matching those of the flange and expanding in a direction away from the flange, and a mixing chamber into which the last-named passages lead.

7. In a carbureter, a carbureting chamber having means at one end for the introduction of air and at the other end provided with an outstanding flange having a series of contracting passages therethrough, an air chamber inclosing the carbureting chamber and its flange and arranged to supply air to the interior of the carbureting chamber, means for introducing fuel into the carbureting chamber through the air opening thereof, a cover member for the carbureting and air chambers arranged in spaced relation to the flange of the carbureting chamber and provided with passages matching those of the flange and expanding in a direction away from the flange, and a mixing chamber into which the last-named passages lead, the passages through the flange and cover member being provided with throttling means for directing fuel toward the edge portions of their smaller ends.

8. In a carbureter, an air chamber provided with a cover member having a circular series of openings near the marginal portion flaring in a direction away from the air chamber, a carbureting chamber within the air chamber provided with an outstanding flange reaching to the inner walls of the air chamber and related to the cover member to form an annular space between the flange and cover member in communication with the passages through the cover member, said flange having matching passages contracting toward the cover member, means for introducing air into the air chamber, means for introducing fuel and air together into the carbureting chamber, and throttling means for the smaller adjacent ends of the passages through the flange and cover member.

9. In a carbureter, an air chamber provided with a cover member having a circular series of openings near the marginal portion flaring in a direction away from the air chamber, a carbureting chamber within the air chamber provided with an outstanding flange reaching to the inner walls of the air chamber and related to the cover member to form an annular space between the flange and cover member in communication with the passages through the cover member, said flange having matching passages contracting toward the cover member, means for introducing air into the air chamber, means for introducing fuel and air together into the carbureting chamber, and throttling means for the smaller adjacent ends of the passages through the flange and cover member, said throttling means consisting of a series of pins each extending through a respective passage in the flange into the space between the flange and cover member and in substantial alinement with the respective passage through the cover member.

10. In a carbureter, an air chamber provided with a cover member having a circular series of openings near the marginal portion flaring in a direction away from the air chamber, a carbureting chamber within the air chamber provided with an outstanding flange reaching to the inner walls of the air chamber and related to the cover member to form an annular space between the flange and cover member in communication with the passages through the cover member, said flange having matching passages contracting toward the cover member, means for introducing air into the air chamber, means for introducing fuel and air together into the carbureting chamber, and throttling means for the smaller adjacent ends of the passages through the flange and cover member, said throttling means consisting of a series of pins each extending through a respective passage in the flange into the space between the flange and cover member and in substantial alinement with the respective passage through the cover member, said series of pins being provided with a support common to all of them and said support having means for holding it adjustably on the carbureting chamber.

11. A carbureter comprising a casing having a mixing chamber at one end and a normally closed valve inlet for air at the other end, an air chamber interior to and spaced from the inner walls of the casing and provided with a cover member having a series of passages therethrough flaring toward the mixing chamber, a carbureting chamber within the air chamber provided with an outstanding flange spacing it from the walls of the air chamber, said flange being in adjacent spaced relation to the inner surface of the cover member and provided with a series of tapering passages matching the flaring passages of the cover member, throttling means extending through the passages in the flange and into operative relation to the smaller ends of the passages through the cover of the air chamber, means for the introduction of fuel into the carbureting chamber, the latter having air inlet means communicating with the air chamber about the fuel inlet means, and pressure responsive devices in communication with the mixing chamber and connected to the air valve of the casing for opening and closing said valve.

12. A carbureter comprising a casing having a mixing chamber at one end and a normally closed valve inlet for air at the other end, an air chamber interior to and spaced from the inner walls of the casing and provided with a cover member having a series of passages therethrough flaring toward the mixing chamber, a carbureting chamber within the air chamber provided with an outstanding flange spacing it from the walls of the air chamber, said flange being in adjacent spaced relation to the inner surface of the cover member and provided with a series of tapering passages matching the flaring passages of the cover member, throttling means extending through the passages in the flange and into operative relation to the smaller ends of the passages through the cover of the air chamber, means for the introduction of fuel into the carbureting chamber, the latter having air inlet means communicating with the air chamber about the fuel inlet means, and pressure responsive devices in communication with the mixing chamber and connected to the air valve of the casing for opening and closing said valve said air pressure responsive devices having means for throttling communication with the mixing chamber to desired extents.

13. A carbureter having carbureting and air chambers in fixed relation one to the other, and a surrounding casing in spaced relation to the air chamber, said casing inclosing a mixing chamber into which the carbureting and air chambers discharge, and with means for the introduction of air into the casing at a point remote from the mixing chamber and constructed to conduct the introduced air between the air chamber and the walls of the casing to the mixing chamber.

14. A carbureter comprising a casing having one end shaped to define a mixing chamber and the other end provided with a controllable air valve, an air chamber intermediate of the casing between the air valve and mixing chamber and inclosed by the casing in spaced relation to its inner wall, said air chamber having a top member with marginal flaring passages therethrough leading into the mixing chamber, a carbureting chamber provided with an outstanding flange having tapering passages therethrough corresponding to the passages in the cover of the air chamber, said carbureting chamber being in elevated spaced relation to the bottom of the air chamber when the parts are installed and provided with an air duct opening into the air chamber, fuel directing means entering the air chamber and the air passage into the carbureting chamber, means for constricting the passages through the flange of the carbureting chamber and the entering ends of the passages through the cover of the air chamber, means for introducing air into the air chamber from the exterior of the casing and independent of the air valve of the latter, a cylinder having means of communication with the mixing chamber with throttling means for the said means of communication, a piston in the cylinder, and connections between the piston and the air valve of the casing, said connections being provided with a spring tending to maintain the air valve closed.

15. A carbureter provided with an air chamber, a mixing chamber with which the air chamber is in communication, a carbureting chamber within the air chamber, a heater constituting a separating wall between the carbureting and mixing chambers, and said carbureting and mixing chambers being in communication exterior to the heater, and a fuel inlet to the carbureting chamber in position to discharge fuel upon the heater.

16. In a carbureter, a carbureting chamber provided at one end with means for the introduction of air and at the same end with means for the introduction of fuel, a heater constituting a closure for the other end of the carbureting chamber and located in the path of the fuel, an air chamber surrounding the carbureting chamber, and a mixing chamber separated from the carbureting chamber by the heater, and said carbureting chamber, air chamber and mixing chamber having means of communication in surrounding relation to the heater.

In testimony, that I claim the foregoing as my own, I have hereto affixed my signature in the presence of two witnesses.

LESTER M. DULL.

Witnesses:
JOHN H. SIGGERS,
DAVID R. WAGNER.

Copies of this patent may be obtained for five cents each, by addressing the "Commissioner of Patents, Washington, D. C."